No. 750,023. PATENTED JAN. 19, 1904.
G. M. DEPEW.
TIRE.
APPLICATION FILED AUG. 29, 1903.
NO MODEL.

WITNESSES:
C. M. Catlin

INVENTOR
Geo. M. Depew,
By
Attorney

No. 750,023.　　　　　　　　　　　　　　　　　　Patented January 19, 1904.

UNITED STATES PATENT OFFICE.

GEORGE M. DEPEW, OF CANANDAIGUA, NEW YORK.

TIRE.

SPECIFICATION forming part of Letters Patent No. 750,023, dated January 19, 1904.

Application filed August 29, 1903. Serial No. 171,204. (No model.)

*To all whom it may concern:*

Be it known that I, GEORGE M. DEPEW, a resident of Canandaigua, in the county of Ontario and State of New York, have invented certain new and useful Improvements in Tires; and I do hereby declare the following to be a full, clear, and exact description of the invention, such as will enable others skilled in the art to which it pertains to make and use the same.

The invention relates to armored and cushioned pneumatic tires for vehicles, and has for its object to provide a simple durable compound tire composed of parts that are independently and conveniently renewable and to provide such a tire composed of several materials specially suitable for their respective offices.

The invention consists in the construction hereinafter described and pointed out.

Figure 1:
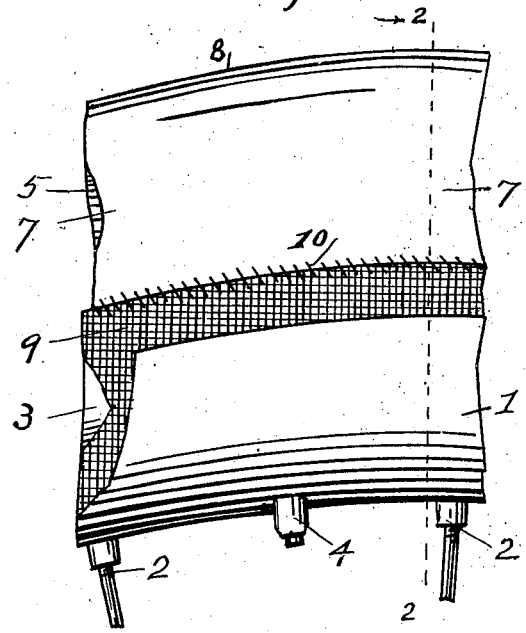
Figure 2:
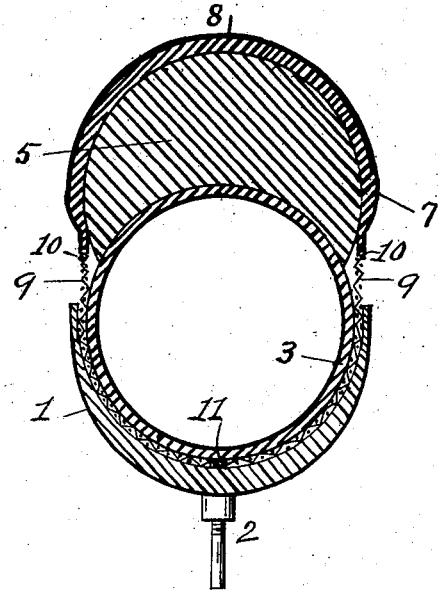
Figure 3:
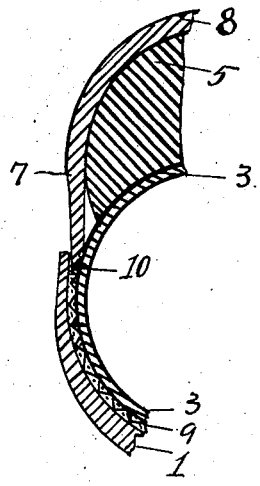

In the accompanying drawings, Figure 1 is a partial side elevation of a wheel embodying the invention, parts being broken away to show the cushion and the rubber tube. Fig. 2 is a cross-section on the line 2 2 of Fig. 1. Fig. 3 is a partial section of a modified detail.

Numeral 1 denotes a wheel-rim, and 2 spokes, which parts may be of any suitable form and character, as required by wheeled vehicles of various kinds.

3 indicates an annular pneumatic tire-tube, of rubber, provided with an inlet-nipple 4 of any approved character, whereby it may be inflated from time to time, as customary.

5 denotes a ring surrounding the tubular annular cushion, acting to prevent perforation of the rubber tube and also to distribute the pressure caused by the impact of the compound tire on the ground. This cushion may be made of solid rubber or other hard compressible material. It is shaped to fit the air-tube substantially as shown. Material such as used for making rope could be used in the form illustrated in Fig. 2, and rope could be thus employed were its strands so loosely braided or twisted as to permit its being shaped to fit the tube in practically the same manner as the cushion indicated in Fig. 2. It is also contemplated using layers of canvas secured together as a cushion, the main function of which is to protect the rubber tire from puncture.

7 denotes a case or armor having its exposed parts or armor proper, 8, made of rubber, leather, or other suitable material adapted to resist wear. This case may be made in one piece; but preferably armor extensions, such as strips of canvas 9 or equivalent, will be secured to the edges of the outer or exposed parts of the armor, as indicated at 10. The edges of the armor or armor extensions are laced together, as indicated at 11, to inclose and hold the cushion and pneumatic tube together. If desired, the rim may extend above the fastenings 10 and cover the seams or joints, as indicated in Fig. 4.

The cushion is by preference made of a relative thickness, as indicated in the drawings, being a thickness approximating that of the tube, though if less thick it will be operative to protect the pneumatic tire under all ordinary conditions.

The materials named are suitable; but others are not excluded. The outer part 8 of armor 7 should be of such material and of such thickness as to withstand wear; the cushion should have hardness and sufficient substance to check the penetration to the pneumatic tube of broken glass, tacks, and the like, and the fastenings, particularly that at 11, should be adjustable and of easy manipulation—as lacing, for example.

In case the armor wears out or the rubber of the tube deteriorates with age or the material of the cushion becomes disarranged either part can be easily and cheaply renewed and independently by any person of ordinary intelligence.

The invention will not be departed from by mere substitution of equivalent material, nor by mechanical changes not materially affecting the principles of operation.

I am aware that a rim and a solid rubber ring have been combined with a pneumatic tire or rim and with an external canvas cover, said cover being fixed to the exterior of the rim. Said pneumatic ring did not fit the tire, and neither the solid nor the pneumatic ring was provided with a seat or depression to fit the other. In said construction the canvas was secured to the exterior of the rim by loops and studs, and projecting parts riveted to the rim were used. By my improvement the canvas cover extends around the interior of the rim and is thereby held therein, as is also the pneumatic tire, which practically fits the rim laterally. It also either fits a seat formed in the solid ring or guard, or it may itself be provided with a seat for such guard when the parts are suitably held against sidewise displacement.

Having thus described my invention, what I claim as new, and desire to secure by Letters Patent, is—

1. In a wheel, a rim, a pneumatic tube of rubber, the wearing-armor, the cushion of resilient material, and means whereby the armor is secured about the tube and cushion and the parts held in operative relation, said means comprising a fabric fitting the tire exteriorly and the rim interiorly.

2. In a wheel, the pneumatic tube of rubber, the wearing-armor, the cushion of resilient material, and means whereby the armor is secured about the tube and cushion and the parts held in operative relation, said means comprising a fabric distinct from the armor and fitting the tire exteriorly and the rim interiorly.

3. In a wheel, the pneumatic tube, the wearing-armor, the cushion of resilient material, means whereby the armor is secured about the tube and cushion and the parts held in operative relation, said means comprising a fabric distinct from the armor and fitting the tire exteriorly and the rim interiorly, and said rim, the joint between the armor and fabric being covered by the rim.

4. In a wheel, the pneumatic tube, the wearing-armor, the cushion of resilient material, means whereby the armor is secured about the tube and cushion and the parts held in operative relation, said means comprising a fabric distinct from the armor and fitting the rim exteriorly and the rim interiorly and composed of parts detachably connected by a fastening situated within the concavity of the rim, and said rim, the joint between the armor and fabric being covered by the rim.

In testimony whereof I have signed this specification in the presence of two subscribing witnesses.

GEORGE M. DEPEW.

Witnesses:
T. M. BLEAKLEY,
E. H. McCRUM.